United States Patent [19]

Komarneni et al.

[11] Patent Number: 5,364,455
[45] Date of Patent: Nov. 15, 1994

[54] SILICA GELS OF CONTROLLED PORE SIZE AS DESICCANT MATERIALS AND PROCESSES FOR PRODUCING SAME

[75] Inventors: Sridhar Komarneni; Prakash B. Malla, both of State College, Pa.

[73] Assignee: Gas Research Institute, Chicago, Ill.

[21] Appl. No.: 949,381

[22] Filed: Sep. 22, 1992

[51] Int. Cl.$^5$ .............................................. B01D 53/04
[52] U.S. Cl. ...................... 95/117; 95/121; 95/900
[58] Field of Search .................... 55/33–35, 55/74, 77–79, 387, 390; 95/117–126, 900

[56] References Cited

U.S. PATENT DOCUMENTS

| | | | |
|---|---|---|---|
| 1,819,643 | 8/1931 | Fleisher | 55/35 X |
| 1,863,579 | 6/1932 | Morse et al. | 55/35 X |
| 2,698,062 | 12/1954 | Veltman et al. | 55/33 |
| 3,141,729 | 7/1964 | Clarke et al. | 55/33 |
| 3,313,739 | 4/1967 | Acker et al. | 252/451 |
| 3,494,874 | 2/1970 | Flanigen et al. | 252/450 |
| 4,398,927 | 8/1983 | Asher et al. | 55/34 |
| 4,402,717 | 9/1983 | Izumo et al. | 55/390 X |
| 4,467,785 | 8/1984 | Langford et al. | 55/33 X |
| 4,610,863 | 9/1986 | Tewari et al. | 423/338 |
| 4,729,774 | 3/1988 | Cohen et al. | 55/390 X |
| 4,871,607 | 10/1989 | Kuma et al. | 55/390 X |
| 4,875,520 | 10/1989 | Steele et al. | 55/390 X |
| 4,894,357 | 1/1990 | Hupe et al. | 502/233 |
| 5,052,188 | 10/1991 | Komarneni et al. | 62/94 |
| 5,147,420 | 9/1992 | Claesson | 55/34 |

*Primary Examiner*—Robert Spitzer
*Attorney, Agent, or Firm*—Perman & Green

[57] ABSTRACT

The present invention relates to a controlled process for producing amorphous, microporous silica gels having a predetermined water sorption isotherm of moderate Type I shape having a separation factor between about 0.07 and 0.1 and micropore diameter size between about 6 and 8.7 angstroms. The present microporous silica gels are prepared by adjusting the pH of the reaction system or by doping the system with various elements during the hydrolysis and condensation of alkoxy silicates to form silica gels therefrom, and the hydrolyzed products are successively polymerized to form polymers and particles containing siloxane bonds as follows:

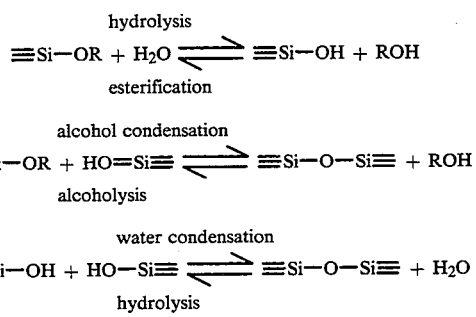

Various factors, for example open vs closed system, amount of water used for hydrolysis, type of alkoxides and solvent, pH, amount of catalyst, temperature, aging and drying conditions etc., affect the nature and the rate of hydrolysis, condensation reactions and network formation, and consequently the properties of the final gel products.

1 Claim, 13 Drawing Sheets

FIGURE 1 Gelation time ($T_{gel}$, hr) as a function of HCl concentrations (M)

FIGURE 2 Water adsorption isotherms of xerogels (Table I) prepared with different concentrations of HCl: (a) Gel E, (b) Gel D, (c) Gel C, (d) Gel B, and (e) Gel A. The solid curve is the ideal isotherm with separation factor of 0.1.

FIGURE 3  Water adsorption (○) and desorption (●) isotherms of gel described in Example 2.

FIGURE 4 Comparison of water adsorption isotherms of $SiO_2$-$ZrO_2$ gels with various Zr/Zr+Si=X: (a) 0.005, (b) 0.01, (c) 0.02, (d) 0.04, and (e) 0.2.

FIGURE 5  Water adsorption (O) and desorption (●) isotherms of $SiO_2-ZrO_2$ gel (X=0.005).

FIGURE 6 Comparison of water adsorption isotherms of $SiO_2-Fe_2O_3$ gels with various $Fe/Fe+Si = X$: (a) 0.02, (b) 0.1, and (c) 0.2.

FIGURE 7  Water adsorption (O) and desorption (●) isotherms of $SiO_2-Fe_2O_3$ gel (X=0.02).

FIGURE 8 Comparison of water adsorption isotherms of $SiO_2-B_2O_3$ gels with various B/B+Si = X: (a) 0.02, (b) 0.04, (c) 0.1, and (d) 0.2.

FIGURE 9  Water adsorption (O) and desorption (●) isotherms of $SiO_2\text{-}B_2O_3$ gel (X=0.02).

FIGURE 10 Comparison of water adsorption isotherms of $SiO_2-P_2O_5$ gels with various P/P+Si=X: (a) 0.005, (b) 0.01, (c) 0.02, (d) 0.1 and (e) 0.2.

FIGURE 11 Water adsorption (O) and desorption (●) isotherms of $SiO_2$-$P_2O_5$ gel (X = 0.005).

FIGURE 12 Water adsorption (O) and desorption (●) isotherms of $SiO_2$-$ZrO_2$ gel (X = 0.005) after (a) 5 and (b) 10 dehydration and hydration cycles.

FIGURE 13  Water adsorption (○) and desorption (●) isotherms of $SiO_2-ZrO_2$ gel (X=0.005) after 30 dehydration and hydration cycles.

SILICA GELS OF CONTROLLED PORE SIZE AS DESICCANT MATERIALS AND PROCESSES FOR PRODUCING SAME

BACKGROUND OF THE INVENTION

The present invention relates to desiccants based on silica gels having an isotherm separation factor within the range of from about 0.07 to about 0.1 and their use in gas-fired cooling and dehumidification equipment.

Desiccant cooling systems, as disclosed more fully in our related U.S. Pat. No. 5,052,188, the disclosure of which is incorporated herein by reference, employ an open cycle to process water vapor between a conditioned space and the environment. The use of thermal energy creates a chemical potential that can be used to produce a cooling effect. If the air can be made dry enough, an evaporative cooler will produce air that is as cold as a conventional electric air conditioner. The overall performance of these systems relies on the quality of the thermal energy input (availability) and the environment as both a cold sink and as a source of chemical potential (unsaturated air). Most solid desiccant cooling cycles consist of a desiccant dehumidifier, a sensible heat exchanger and two evaporative coolers. There are two important modes of operation: 1) The ventilation mode where outdoor air is processed to produce low enthalpy air for the cooled space, and 2) The recirculation mode where air from the cooled space is processed to maintain low enthalpy air conditions in the space.

A schematic of the ventilation mode (a) and a psychrometric representation of the cycle (b) are shown in FIG. 1 of U.S. Pat. No. 5,052,188. Ambient air at (1) is adiabatically dehumidified by the desiccant (DH). The hot, dry air at (2) is cooled by the sensible heat exchanger (HE) to create dry cool air at (3). This air is then adiabatically humidified by the evaporative cooler (EC) to produce cold, nearly saturated air at (4) that enters the building. Simultaneously, an equal amount of building air at (6) is adiabatically humidified to (7). This produces the cold sink for the dry air (3). The air is then heated by the same heat exchanger to (8). This is an attempt to recuperate as much of the heat of sorption as possible from the dehumidification process. The enthalpy of the air must now be increased to (9) by a thermal energy input such as natural gas heating. This air is then passed through the desiccant in order to regenerate it. The warm, humid air that exits the desiccant at (10) is then exhausted to the atmosphere.

A schematic of the recirculation mode (a) and a psychrometric representation of the cycle (b) are shown in FIG. 2 of U.S. Pat. No. 5,052,188. This time ambient air at (1) is adiabatically humidified to (2). This air now becomes the cold sink for the cycle. It is heated by the sensible heat exchanger to (3) and then further heated to (4) by an external thermal input such as natural gas heating. This air is then used to regenerate the desiccant material. The warm, humid air that exits the desiccant at (5) is returned to the environment. Simultaneously, room air at (6) is adiabatically dehumidified by the desiccant to produce warm, dry air at (7). This air is then cooled with the humidified and cooled ambient air to create cool, dry air at (8). The air is then adiabatically humidified to produce the cold, near saturated air at (9) which is returned to the building.

Both of the operational modes previously described operate on a continuous basis. That is, both the dehumidification and the regeneration processes occur at different parts of the cycle simultaneously. In order to accomplish this, the desiccant is deployed into a rotating wheel or drum that continuously cycles the desiccant between the dehumidification and regeneration air streams. The heat exchanger may be of a rotating or static design and the evaporative coolers must be distinctly separate units.

Three important interrelated performance parameters that determine the viability of desiccant cooling systems include:

1. Thermal coefficient of performance (COP).
   The thermal COP is the nondimensional ratio of the amount of cooling output that is produced by a given amount of external energy input. For comparative purposes, COP is often quoted at Air Conditioning and Refrigeration Institute (ARI) rating conditions of 95° F. dry bulb and 75° F. wet bulb outdoor temperatures and 80° F. dry bulb and 67° F. wet bulb indoor temperatures.
2. Parasitic electric energy efficiency ratio (EER).
   The EER is a measure of the amount of cooling, in thermal units (BTUs), that is produced by a given amount of parasitic electric energy input for fans, pumps, etc. in electrical units (Watts).
3. Specific cooling capacity (SCC).
   This factor is defined as tons of cooling capacity per 1000 cubic feet per minute of supply air.

A combination of higher COP values and increased SCC values yields desiccant cooling systems that are more efficient and cost effective than state of the art devices. It has been determined that one of the primary factors affecting these values is the identity of the particular desiccant material employed in the system in terms of its psychrometric performance in the dehumidifier section of the system. For both the dehumidification and regeneration processes, there are two fundamental wavefronts that occur. The first and fastest wave is primarily a thermal front that is most affected by the total amount of thermal heat capacity associated with the dehumidifier. The second and slowest wave is the main concentration wavefront with strong associated thermal effects. Without getting into the details of the physical chemistry involved, it has been postulated that the primary function of an ideal desiccant material in an open cycle desiccant cooling system should be to produce the sharpest possible concentration wavefronts for both the dehumidification and regeneration processes.

Properties of ideal desiccants effecting these characteristics have been determined to include low heat of adsorption, high water adsorption capacity, high diffusivity of water, high chemical and physical stability towards heat, and most importantly, the shape of the desiccant isotherm.

It has been determined that the ideal shape of the desiccant isotherm for use in gas fired cooling-/dehumidifier systems has a separation factor ranging from 0.07 to about 0.1 in accordance with the isotherm equation:

$$X = \frac{P}{R + P - RP}$$

wherein X is the normalized loading fraction of water, P is the relative vapor pressure of water and R is the separation factor.

Several adsorption isotherms with different identified separation factors are shown in FIG. 3 of U.S. Pat. No. 5,052,188. Extreme Brunauer Type I isotherm is shown by the curve designated 0.01, whereas linear and less than linear isotherms are shown by the line designated 1.0 and the curve designated 10.0. The ideal isotherm shape is depicted as the area between the curves designated 0.07 and 0.1.

Most of the commercially available desiccant materials have not been developed for the specific purpose of providing space cooling. In most present day applications, the necessity of achieving efficient regeneration as well as deep drying of the air has not been a consideration. The requirement of attaining the very sharp adsorption wavefronts associated with molecular sieves along with the more efficient regeneration characteristics of the desiccant are what makes this application unique commercially. It is not surprising therefore, that none of the commercially available desiccants match the properties needed. The isotherms of various commercial and laboratory-developed desiccants are shown in FIG. 4 of U.S. Pat. No. 5,052,188. The trend is to see linear or nearly linear (Brunauer Type II) isotherms or extreme (Brunauer Type I) isotherms, as compared with the nearly ideal isotherm shape (moderate type I or Langmuir) designated as the "desired shape" for the purposes of this invention. This isotherm has a separation factor (R) of about 0.1.

U.S. Pat. No. 5,052,188 relates to processes for altering crystalline zeolite materials to render them more suitable for use as desiccant materials in gas fired cooling and air conditioning applications and to the achievement of ideal desiccant materials for such applications having an isotherm separation factor within the range of from about 0.07 to about 0.1.

The starting zeolite materials used according to our U.S. Pat. No. 5,052,188, as synthesized or as purchased, yield an extreme type I isotherm when the isothermal properties are evaluated. Therefore such materials must be modified or altered according to the process of our Patent in order to dealuminize the starting material and replace the bulky metallic cations with less bulky hydrogen ions and thereby increase the water absorptive capacity of the zeolite and produce a reprocessed zeolite having an isothermal separation factor within the range of from about 0.07 to about 0.1.

However it is highly desirable to provide a process for directly synthesizing ideal desiccant materials suitable for use in gas-fired cooling and air conditioning systems, i.e., having moderate Type I or Langmuir isotherm shapes, rather than reprocessing conventional zeolites to make them suitable.

Reference is made to U.S. Pat. No. 3,494,874 which discloses the preparation of porous silica gels using metal silicates. The pore sizes range between 20 angstroms and 50 angstroms in radius, or 40 to 100 in diameter. Pores within the diameter range of 20 to 500 angstroms are defined as "mesopores" and pores with diameters equal to or less than 20 angstroms are defined as "micropores" by the International Union of Pure and Applied Chemistry (IUPAC). The gels of this Patent absorb large amounts of water at high relative pressure and therefore the shape of their isotherms appears to be Type IV rather than Type I.

Reference is also made to U.S. Pat. No. 3,313,739 which discloses the preparation of porous silica gels from sodium silicate. The gels of this Patent have pore diameters of 21 angstroms or more and isotherm shapes having a separation factor of about 0.3, as calculated from the examples thereof.

Reference is also made to U.S. Pat. No. 4,894,357 which related to supercritical drying (aerogels). The water absorption data reported in U.S. Pat. No. 4,894,357 indicates the existence of Type IV or Type V isotherm for the materials of this Patent.

Accordingly, it is an object of the present invention to synthesize microporous silica gel materials which achieve a moderate Type I isotherm with a separation factor range of from about 0.07 to about 0.1.

Another object of this invention is to produce microporous silica gel materials which are ideally suited for use as desiccants in gas fired open space air-conditioning and dehumidification systems.

SUMMARY OF THE INVENTION

The present invention relates to a controlled process for producing amorphous, microporous silica gels having a predetermined water sorption isotherm of moderate Type I shape having a separation factor between about 0.07 and 0.1 and micropore diameter size between about 6 and 8.7 angstroms, as shown in Table 1.

According to the present processes, the present microporous silica gels are prepared by adjusting the pH of the reaction system or by doping the system with various elements during the hydrolysis and condensation of alkoxy silicates to form silica gels therefrom.

In the synthesis of silica gels from alkoxides $Si(OR)_4$ (R=alkyl group) is hydrolyzed and the hydrolyzed products are successively polymerized to form polymers and particles containing siloxane bonds. The hydrolysis and condensation reactions can be represented as follows:

Various factors, for example open vs closed system, amount of water used for hydrolysis, type of alkoxides and solvent, pH, amount of catalyst, temperature, aging and drying conditions etc., affect the nature and the rate of hydrolysis, condensation reactions and network formation, and consequently the properties of the final gel products, as will be apparent from the following examples.

DETAILED DESCRIPTION OF THE INVENTION

As indicated above, microporous silica gel materials may be synthesized in accordance with the process disclosed herein to produce ideal desiccants.

The following examples, in association with the accompanying Tables and illustrations in the drawings disclose various specific embodiments of the present invention.

EXAMPLE 1

Figure 1:
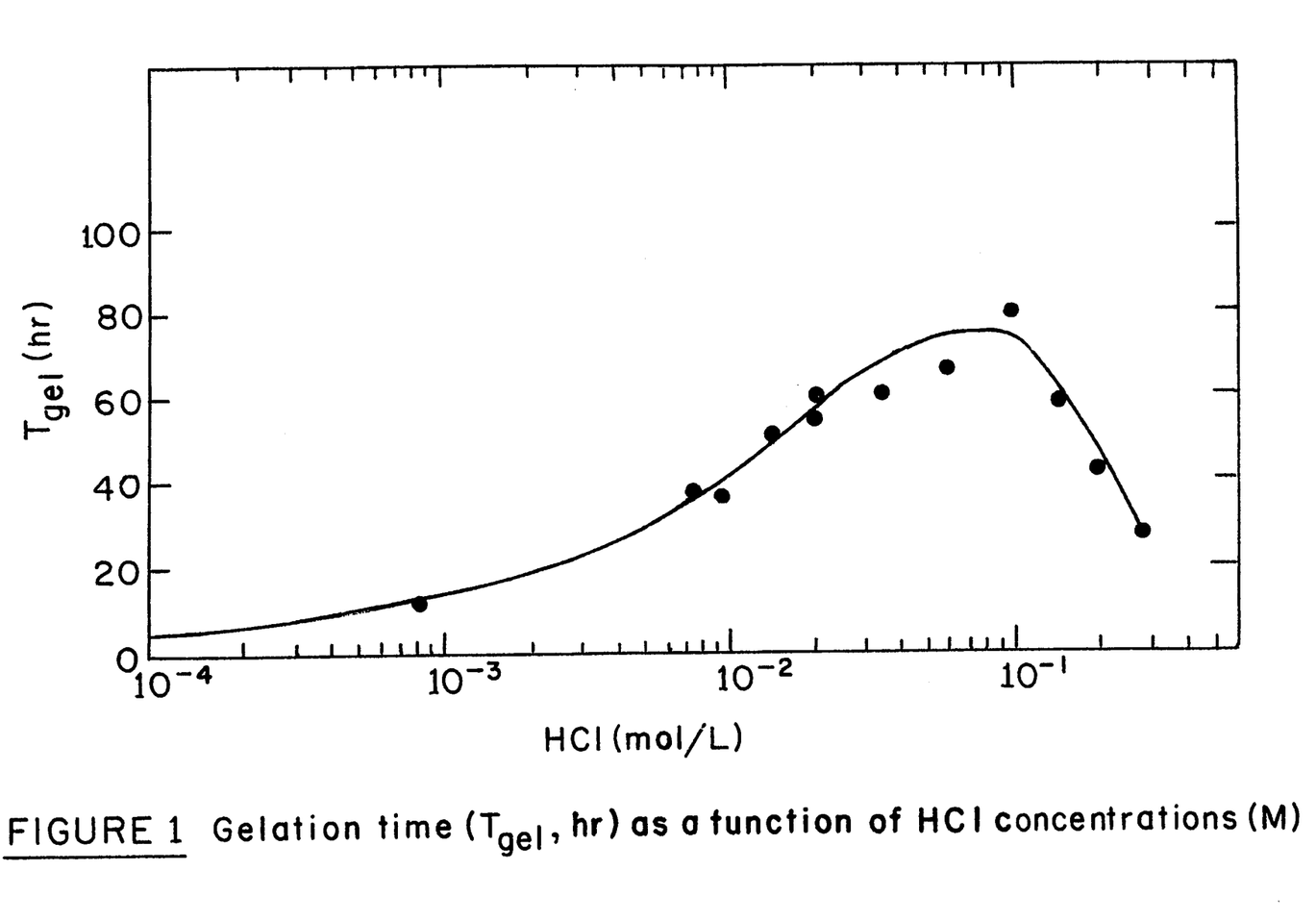
FIG. 1 is a plot showing gelation time vs. HCl concentration for a desiccant material prepared according to Example 1 of the present application.
Figure 2:
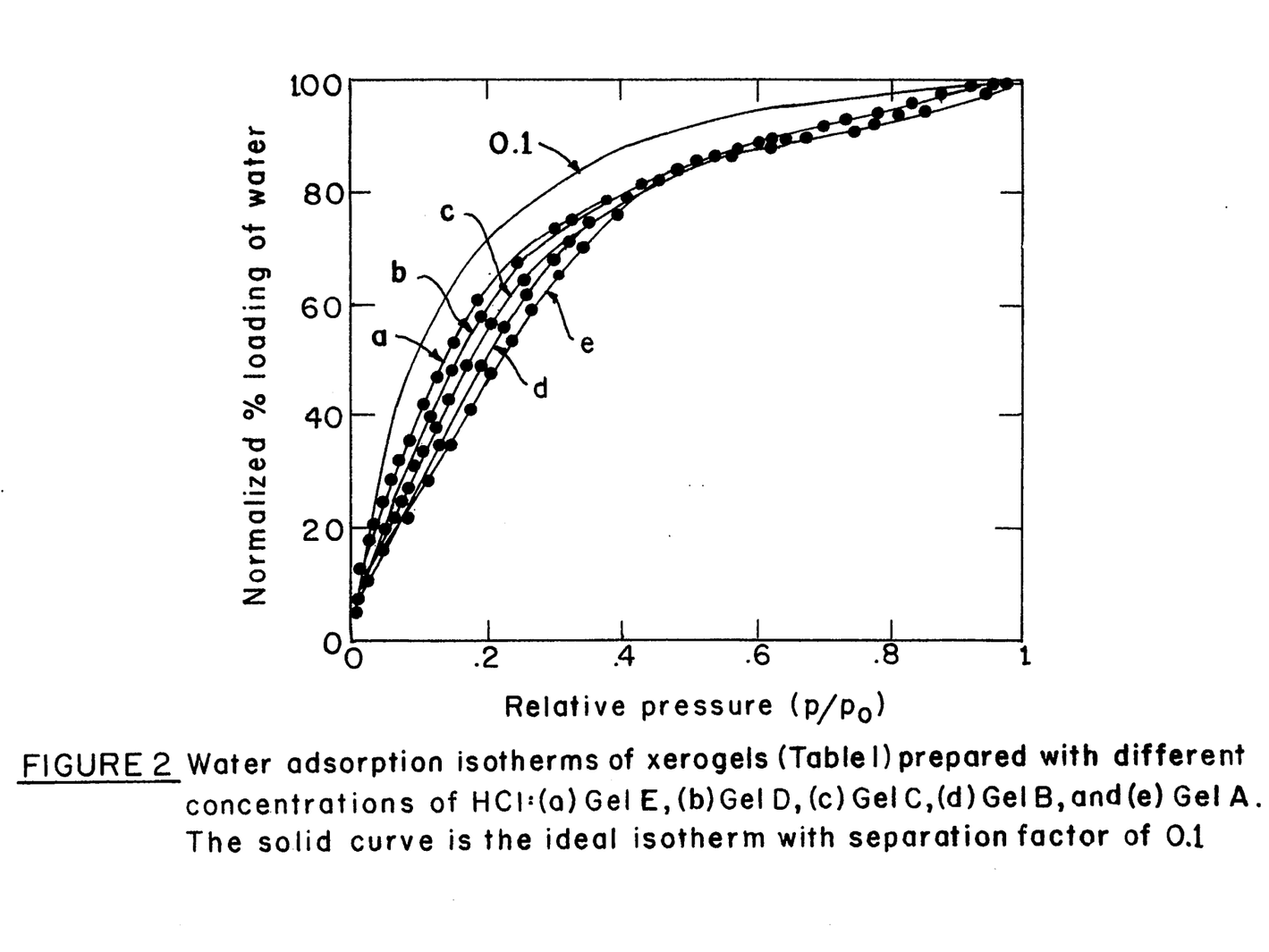
FIGS. 2–13 are plots of water adsorption and desorption isotherms of various materials described herein.

Ten milliliters of tetramethylorthosilicate (TMOS) was mixed separately with 6 ml of various concentrations of hydrochloric acid (HCl) solutions, as shown in Table 1, in airtight polypropylene bottles. The reaction between TMOS and HCl produced large heat, therefore the bottles were cooled to room temperature by immersing the bottles in cold tap water. The resulting mixtures A through G were stirred using magnetic stirrer until gelation. After gelation, the gel mass was kept in the closed bottle for about 24 hr followed by drying at 65° C.–70° C. for another 2 days. Adsorption properties were measured after heating the gels at 200° C. for 4 hr unless otherwise mentioned. Some gel properties are given in Table 1. As shown by FIG. 1, the pore-size, surface area and sorption capacity went through a maximum at around $10^{-1}$M HCl. This is apparently related to the isoelectric point of silica which lies between the pH value of 1 and 2. Water adsorption isotherms for gels A through F are presented in FIG. 2. The best isotherm shape (close to R=0.1) was achieved with the gel E prepared using $10^{-1}$M HCl.

TABLE 1

Conditions for Gel Synthesis (TMOS-HCl system), Average Slit Width, Total Sorption Capacity and Net Heat of Sorption.

| Gels | HCl (M) | pH(HCl) | Average Slit Width[1] (A) | Sorption Cap. (p/po = 0.96 ± 0.01)g/g | Heat (Kcal/mole) Net |
|---|---|---|---|---|---|
| A[2] | 0.0 | 5.86 | 8.7 | 0.27 | 0.974 |
| B | $10^{-4}$ | 4.02 | 8.2 | 0.258 | 1.039 |
| C | $9 \times 10^{-4}$ | 3.04 | 7.8 | 0.237 | 1.139 |
| D | $8 \times 10^{-3}$ | 2.10 | 7.3 | 0.210 | 1.191 |
| E | $10^{-1}$ | 1.03 | 7.0 | 0.191 | 1.348 |
| F | $1.5 \times 10^{-1}$ | — | 7.2 | 0.196 | 1.203 |
| G | $1.9 \times 10^{-1}$ | 0.77 | 7.8 | 0.231 | 1.059 |

TMOS = 10 ml; HClaq = 6.0 ml; [H₂O]/[TMOS] = 4.96
[1]Average slit width (pore-size) estimated from t-plot of water.
[2]Deionized water only

EXAMPLE 2

Figure 3:
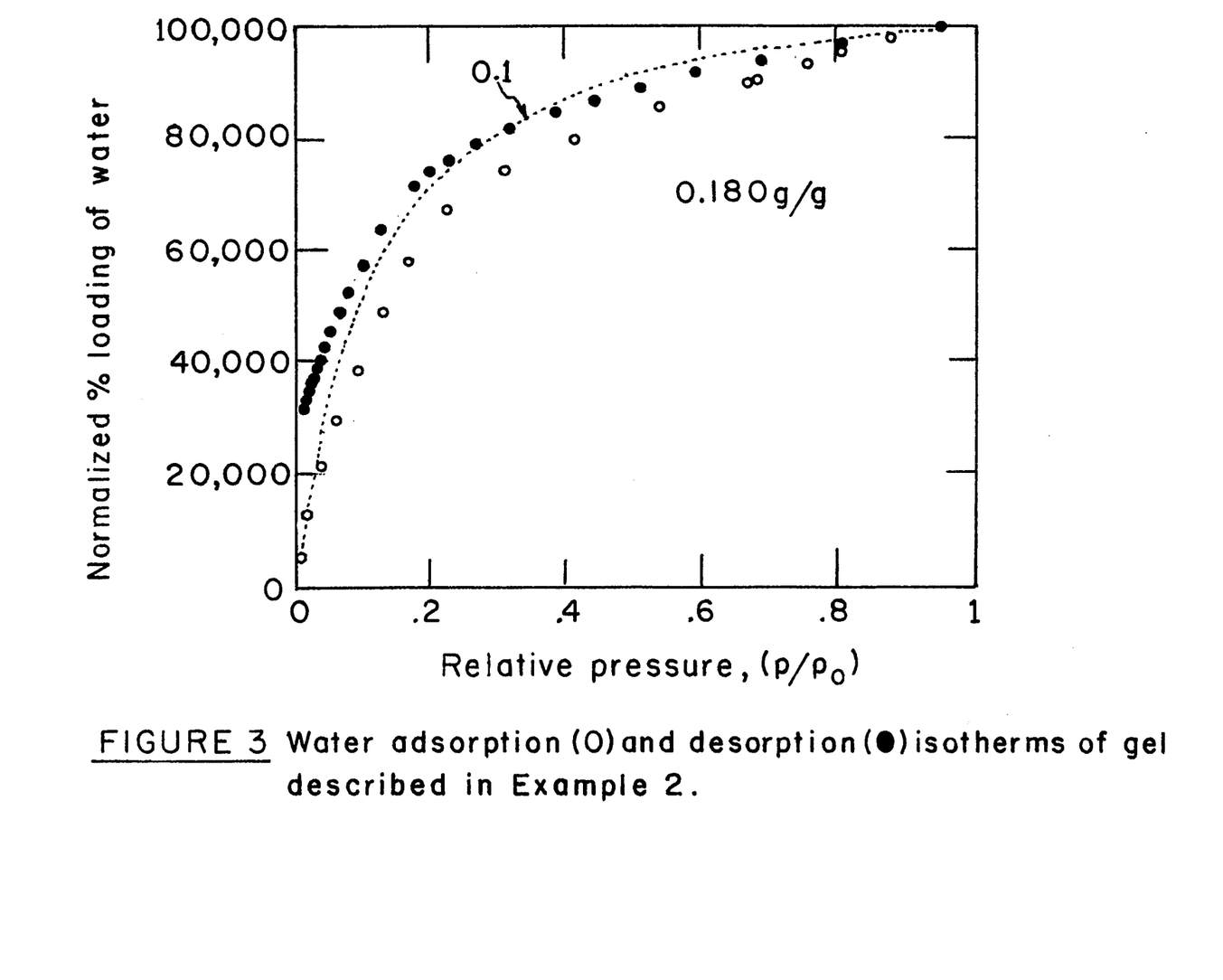

Reaction of 10 ml TMOS and 6 ml $10^{-1}$M HCl was carried out in a similar manner as outlined in Example 1 except that the reaction bottles were not cooled. This process yielded gel in shorter time (56 hr) compared to the process used in Example 1. The water sorption isotherms are illustrated in FIG. 3.

EXAMPLE 3

Ten milliliters of TMOS was mixed with 6.5 ml of $ZrOCl_2.8H_2O$ solution of varying concentrations to produce nine samples. The atom ratio, M/M+Si(X) was varied from 0 to 0.2 where M=Zr. The H₂O/TMOS molar ratio was kept constant at 5.37. The reaction was performed at room temperature in closed system with constant stirring of the solution-sol. After gelation, the products were dried at 65°–70° C. for 2 days and heated in air at 200° C. for 4 hr. Gels were evacuated at 200° C. for ≧5 hr before water sorption measurement at 25° C.

Figure 4:
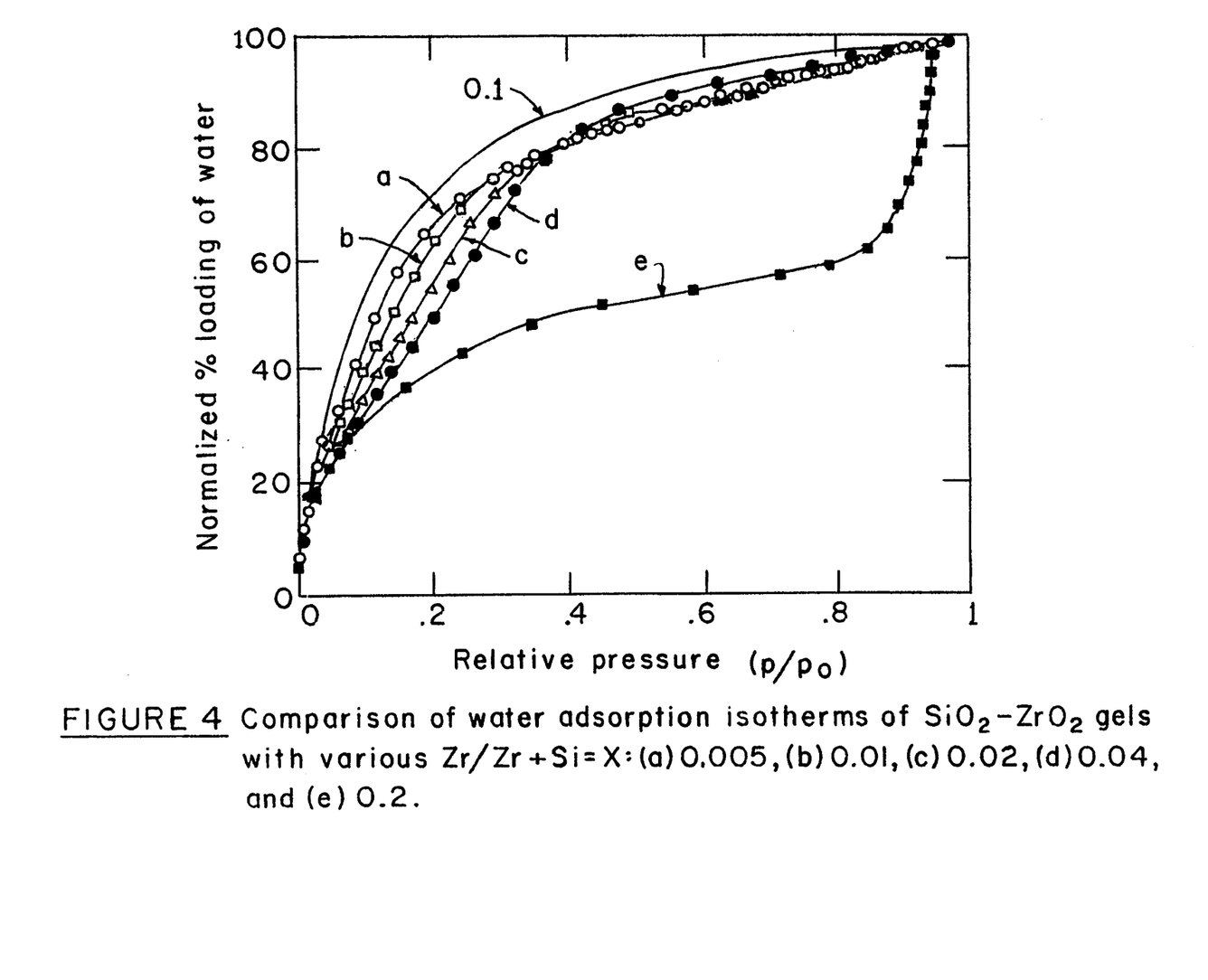

Some gel properties of the nine gels are given in Table 2. Gelation time of samples first increased and then decreased as the X increased. Water adsorption isotherms of Gels 4 and 6 to 9 containing various amounts of Zr are compared in FIG. 4. The best isotherm shape was obtained with X=0.005 which corresponds to the gel 4 having highest gelation time. Both water sorption capacity and nitrogen BET surface area are lowest for this sample except for Gel 9. A large high pressure condensation which did not show the tendency to level off was obtained with X=0.2 (Gel 9) indicating that a large amount of zirconia in this sample did not enter the silica network but formed discrete particles creating interparticle macroporosity. This is also evident from the sharp decrease in nitrogen surface area.

Figure 5:
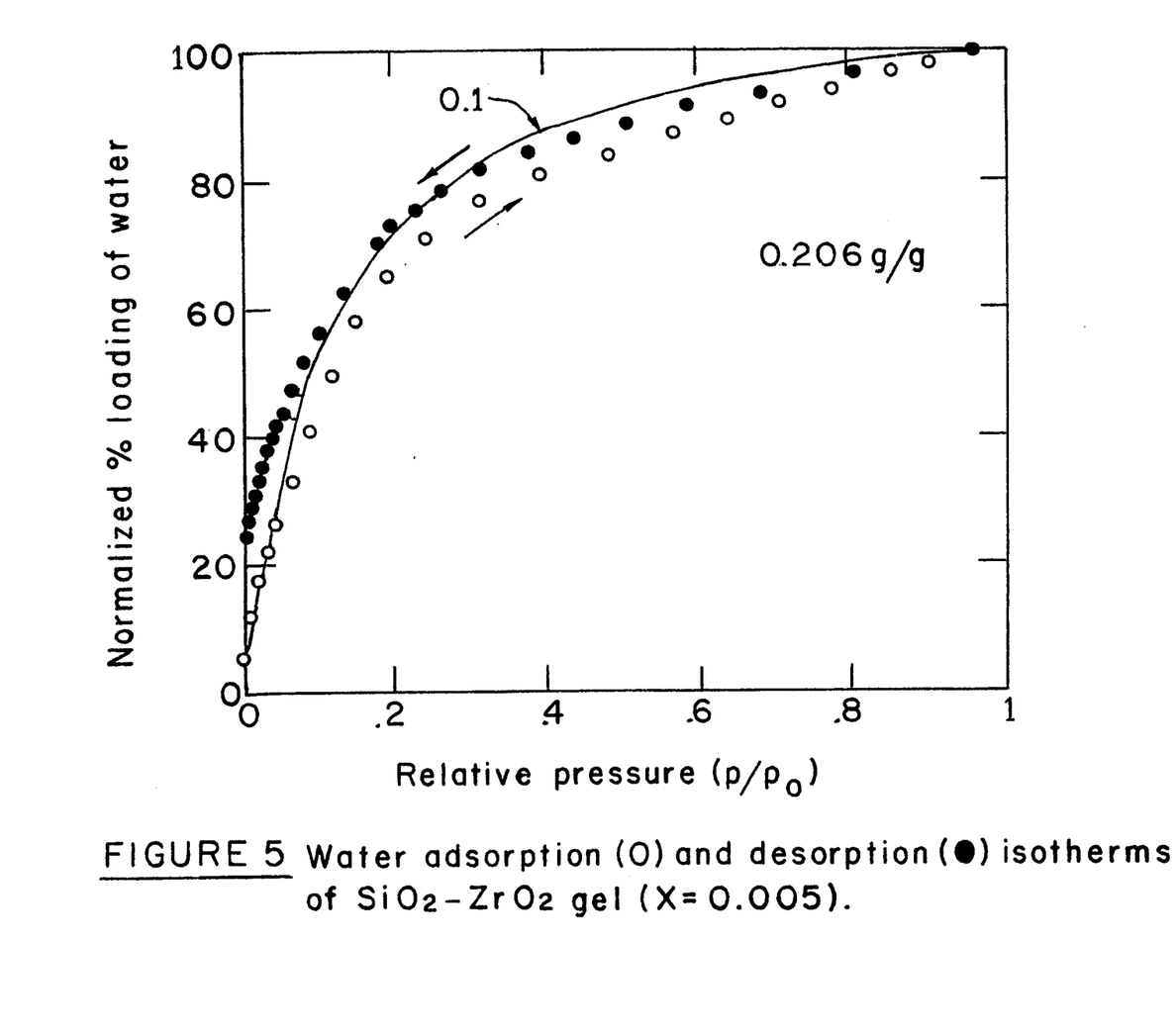

The adsorption and desorption isotherms of Gel 4 with X=0.005 are presented in FIG. 5. The isotherm of this gel practically followed the isotherm with separation factor of 0.1.

TABLE 2

Conditions for gel synthesis (SiO₂—ZrO₂ system) and some sorption properties.

| Gel | X[1] | pH[2] | Gelation time (hr) | Sorption cap.[3] (g/g, p/po = 0.95) | N₂BET surface area (m²/g) |
|---|---|---|---|---|---|
| 1 | 0 | 5.86 | 3 | 0.276 | 505 |
| 2 | 0.00025 | 2.71 | 25 | ND | ND |
| 3 | 0.001 | 2.31 | 42 | ND | ND |
| 4 | 0.005 | 1.58 | 51 | 0.206 | 373 |
| 5 | 0.008 | 1.40 | 26 | ND | ND |
| 6 | 0.010 | 1.26 | 19 | 0.216 | 390 |
| 7 | 0.020 | 1.00 | 4.0 | 0.247 | 457 |
| 8 | 0.040 | 0.62 | 3 min | 0.269 | 474 |
| 9 | 0.200 | ND | 1 min | 0.276 | 101 |

[1][Zr]/[Zr] + [Si] = X; ND = Not determined
[2]pH of the ZrOCl₂.8H₂O solution
[3]p/po = relative vapor pressure of water.

EXAMPLE 4

Figure 6:
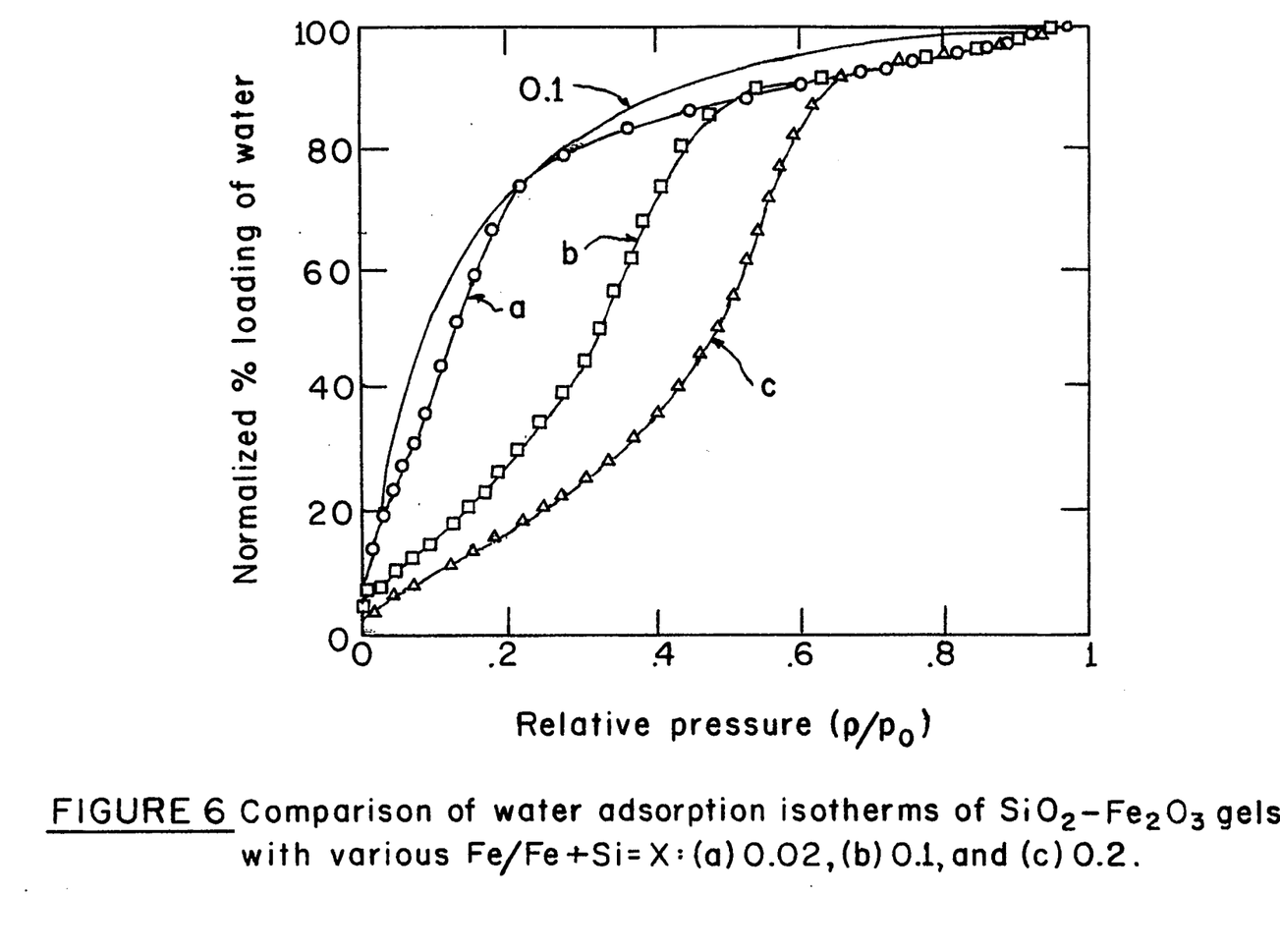

Gels were prepared in exactly the same way as in Example 3 except that M=Fe(FeCl₃.6H₂O) were used. Gelation time of samples first increased and then decreased as the X increased, as illustrated by Table 3. This is apparently related to the pH of the FeCl₃.6H₂O solution, that is maximum gel time was achieved around the isoelectric point of silica as has been observed in TMOS-HCl and TMOS-ZrOCl₂.8H₂O systems. Water adsorption isotherms of Gels 4, 7 and 8 containing various amounts of Fe are compared in FIG. 6. Type I isotherms were obtained with X=0.005–0.04, i.e. Gels 2 to 6. Samples with increased X, that is, X=0.1 and 0.2 exhibited isotherm shapes intermediate between Type IV and V indicating larger pore-size (and its distribution) and slightly hydrophobic behavior and therefore Gels 7 and 8 are unsatisfactory.

Figure 7:
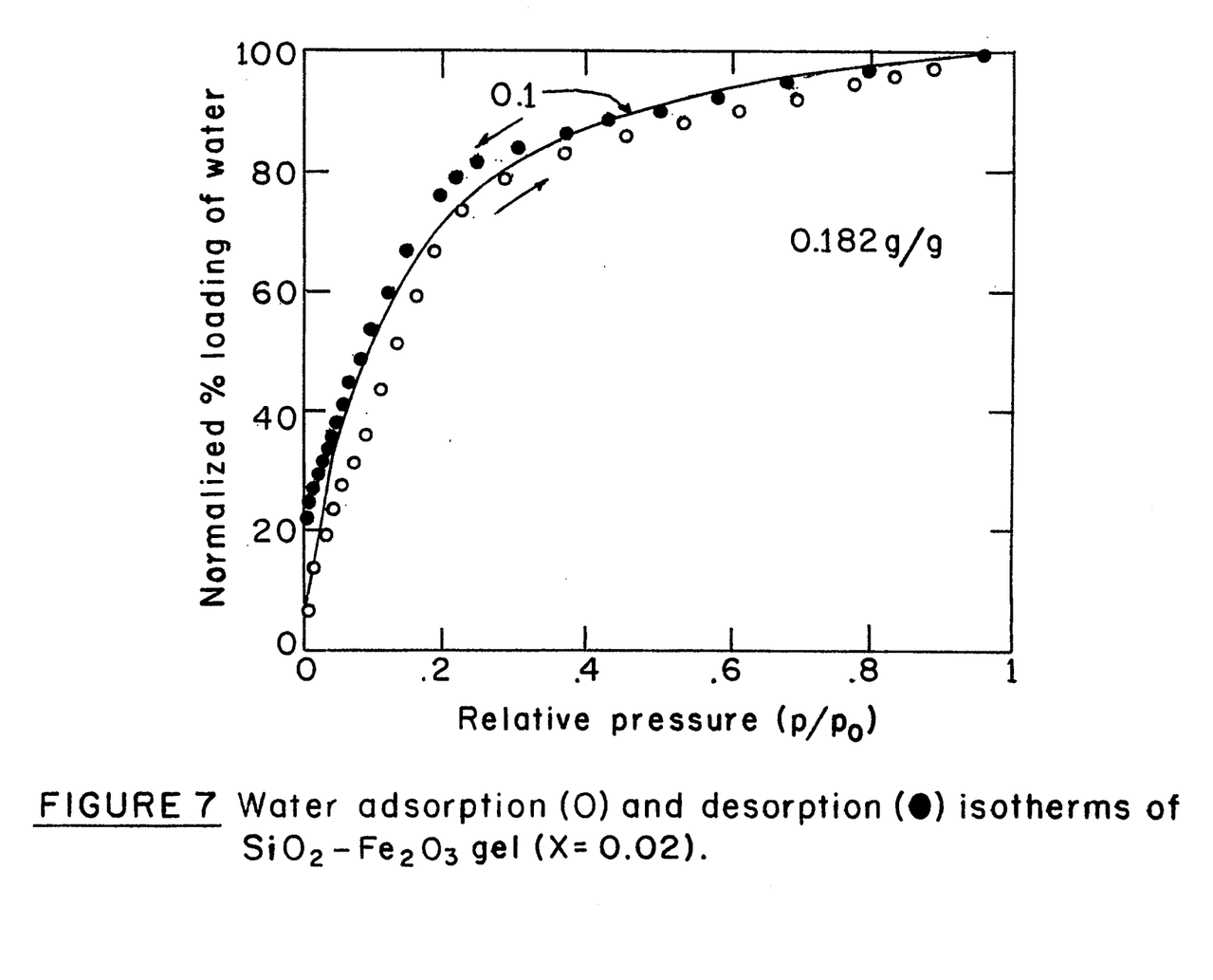

The adsorption and desorption isotherms of Gel 4 with X=0.02 are presented in FIG. 7. The adsorption and desorption isotherms of this gel showed a separation factor of 0.1.

TABLE 3

Conditions for gel synthesis (SiO₂—Fe₂O₃) and some sorption properties

| Gel | X[1] | Gelation time (hr) | Sorption capacity (g/g, p/po = 0.95)[2] |
|---|---|---|---|
| 1 | 0 | 3 | 0.276 |

TABLE 3-continued

Conditions for gel synthesis ($SiO_2$—$Fe_2O_3$) and some sorption properties

| Gel | $X^1$ | Gelation time (hr) | Sorption capacity (g/g, p/po = 0.95)$^2$ |
|---|---|---|---|
| 2 | 0.005 | 32.5 | 0.181 |
| 3 | 0.010 | 38 | 0.187 |
| 4 | 0.020 | 37 | 0.187 |
| 5 | 0.030 | 33 | ND |
| 6 | 0.040 | 27 | 0.231 |
| 7 | 0.100 | 15 | 0.303 |
| 8 | 0.200 | 3 | 0.352 |

$^1$[Fe]/[Fe] + [Si] = X; ND = Not determined
$^2$p/po = relative vapor pressure of water

EXAMPLE 5

Figure 8:
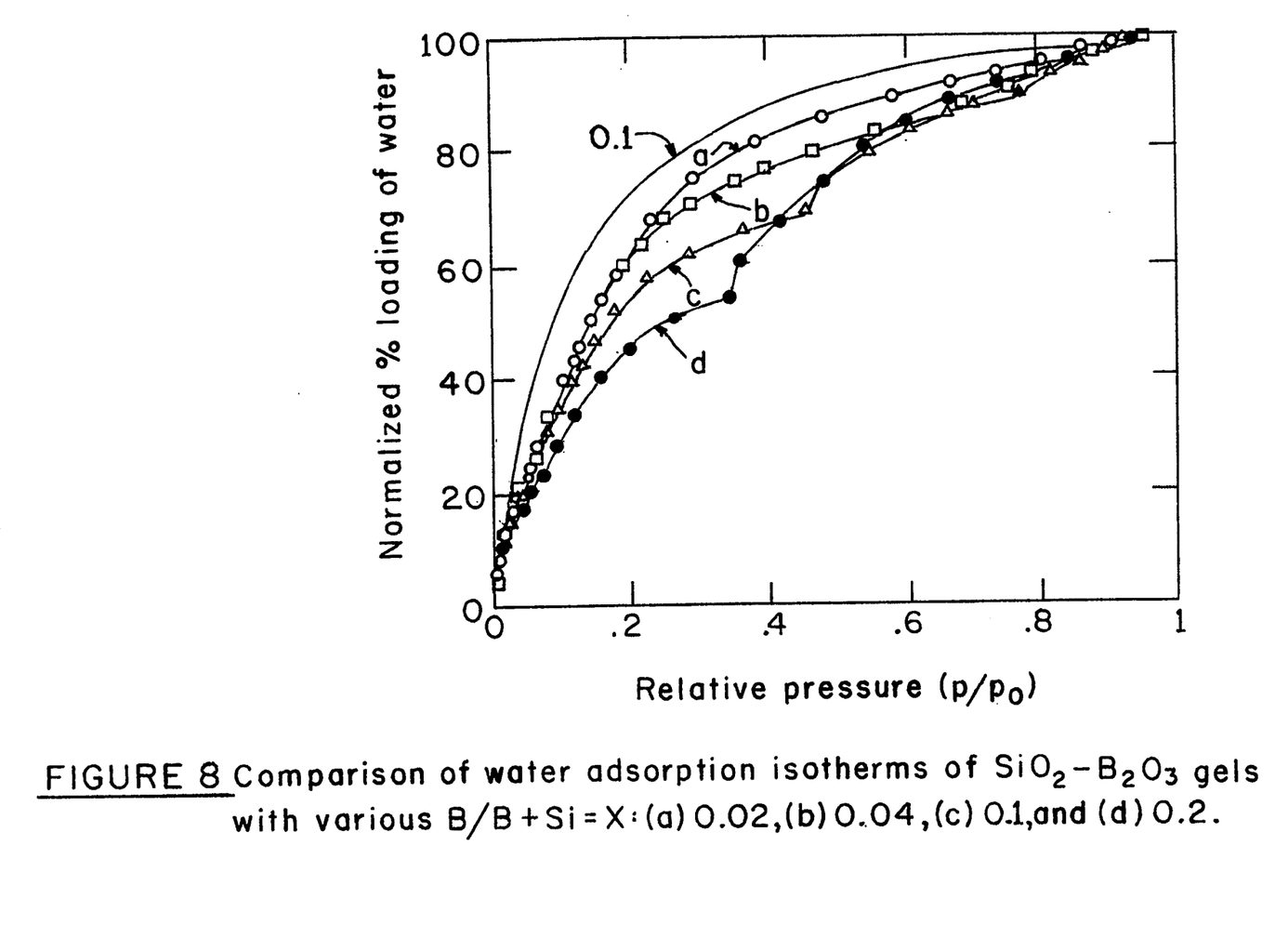

Gels were prepared in exactly the same way as in Example 4 except that M=B ($H_3BO_3$) was used. There was apparently no effect of the amount of boron (B) on gelation time as illustrated by Table 4. Water adsorption isotherms of Gels 2 to 5 containing various amounts of B are compared in FIG. 8. Type I isotherms were obtained with Gels 2 and 3 in which X=0.02—0.04. Although Gels 4 and 5 in which X=0.1 and 0.2 initially exhibited isotherm shape which were concave to P/P0 axis, there was a discontinuity in the isotherm probably as a result of the sharp bimodal distribution of pore-size. Such distribution of pore size in X=0.1 and 0.2 may have been achieved as a result of initial low solubility of boric acid in water followed by its complete dissolution in methanol produced from the hydrolysis of TMOS. All of the isotherms, however, showed better fit with Langmuir than BET equation in the relative pressure range of 0.05–0.35 indicating the microporous nature of the gels.

Figure 9:
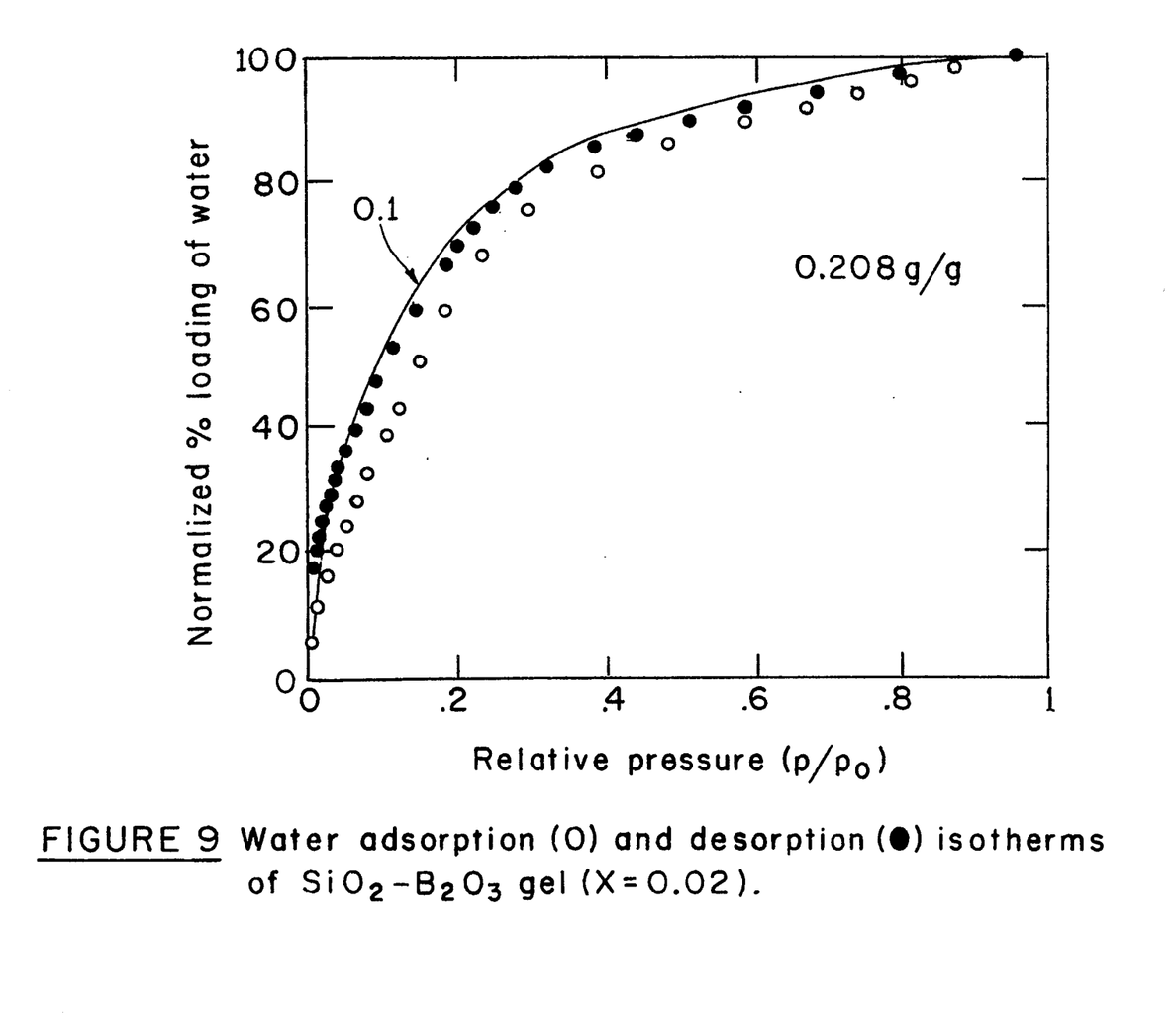

The adsorption and desorption isotherms of Gel 2 with X=0.02 are presented in FIG. 9. The isotherms showed separation factor of 0.10 to 0.15.

TABLE 4

Conditions for gel synthesis ($SiO_2$—$B_2O_3$ system), gelation time and sorption capacities.

| Gel | $X^1$ | Gelation time (hr) | Sorption capacity (g/g, p/po = 0.95)$^2$ |
|---|---|---|---|
| 1 | 0 | 3 | 0.276 |
| 2 | 0.02 | 25 | 0.208 |
| 3 | 0.03 | 29 | ND |
| 3 | 0.04 | 24 | 0.216 |
| 4 | 0.10 | 24 | 0.244 |
| 5 | 0.20 | 26 | 0.321 |

$^1$[B]/B + [Si] = X; ND = Not determined
$^2$p/po = relative vapor pressure of water

EXAMPLE 6

Gels were prepared exactly the same way as in Example 4 except that M=P ($H_3PO_4$) was used. As observed in other gel systems, the gelation time first increased and then decreased as the amount of $H_3PO_4$ increased as shown in Table 5. The highest gel time was observed for the solution pH (of phosphoric acid+water) of 1.72 in Gel 3 which is higher than for HCl (pH=1.0) and $ZrOCl_2.8H_2O$ (pH=1.58) systems, apparently due to the shift of isoelectric point of silica to higher pH.

Figure 10:
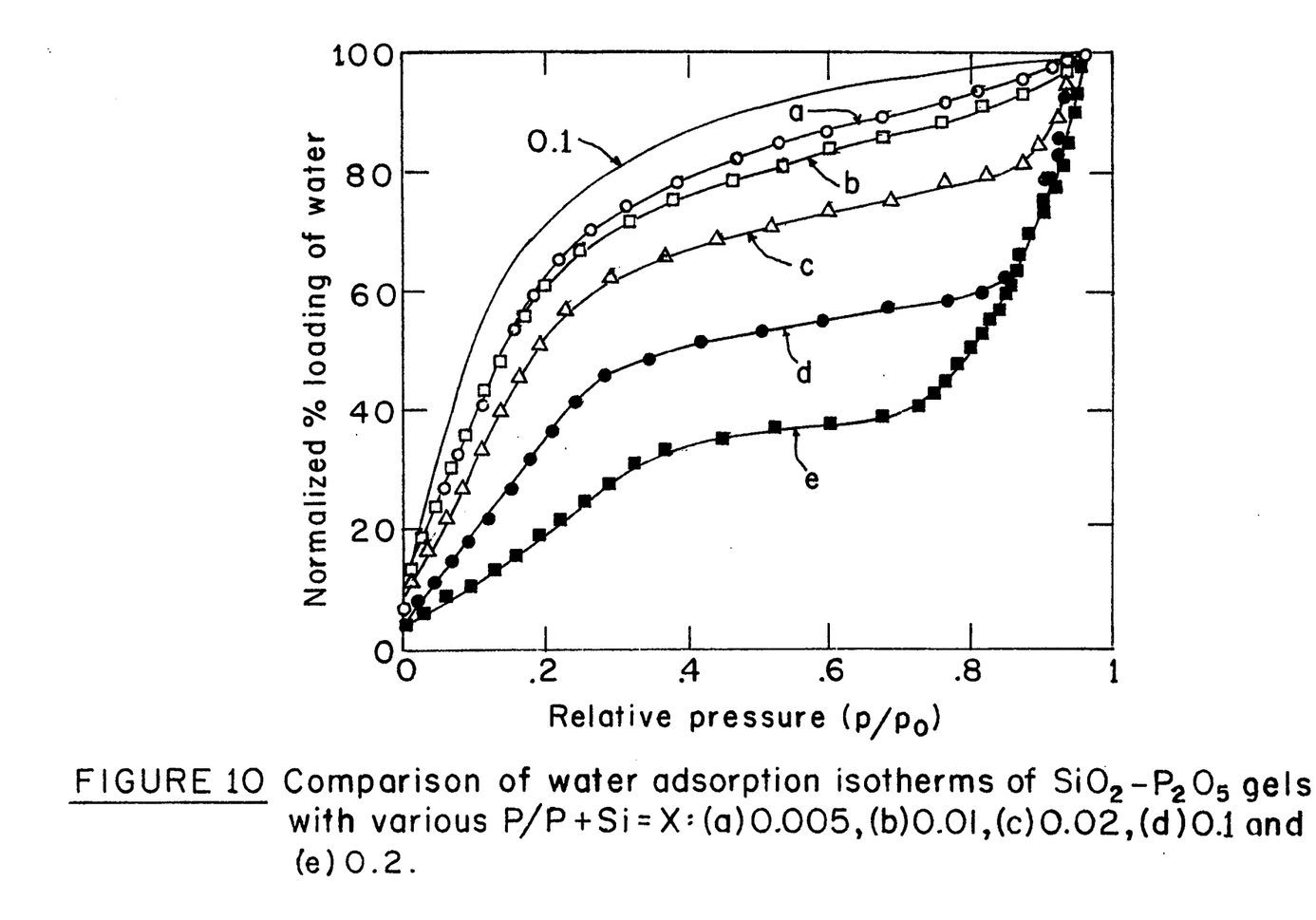
Figure 11:
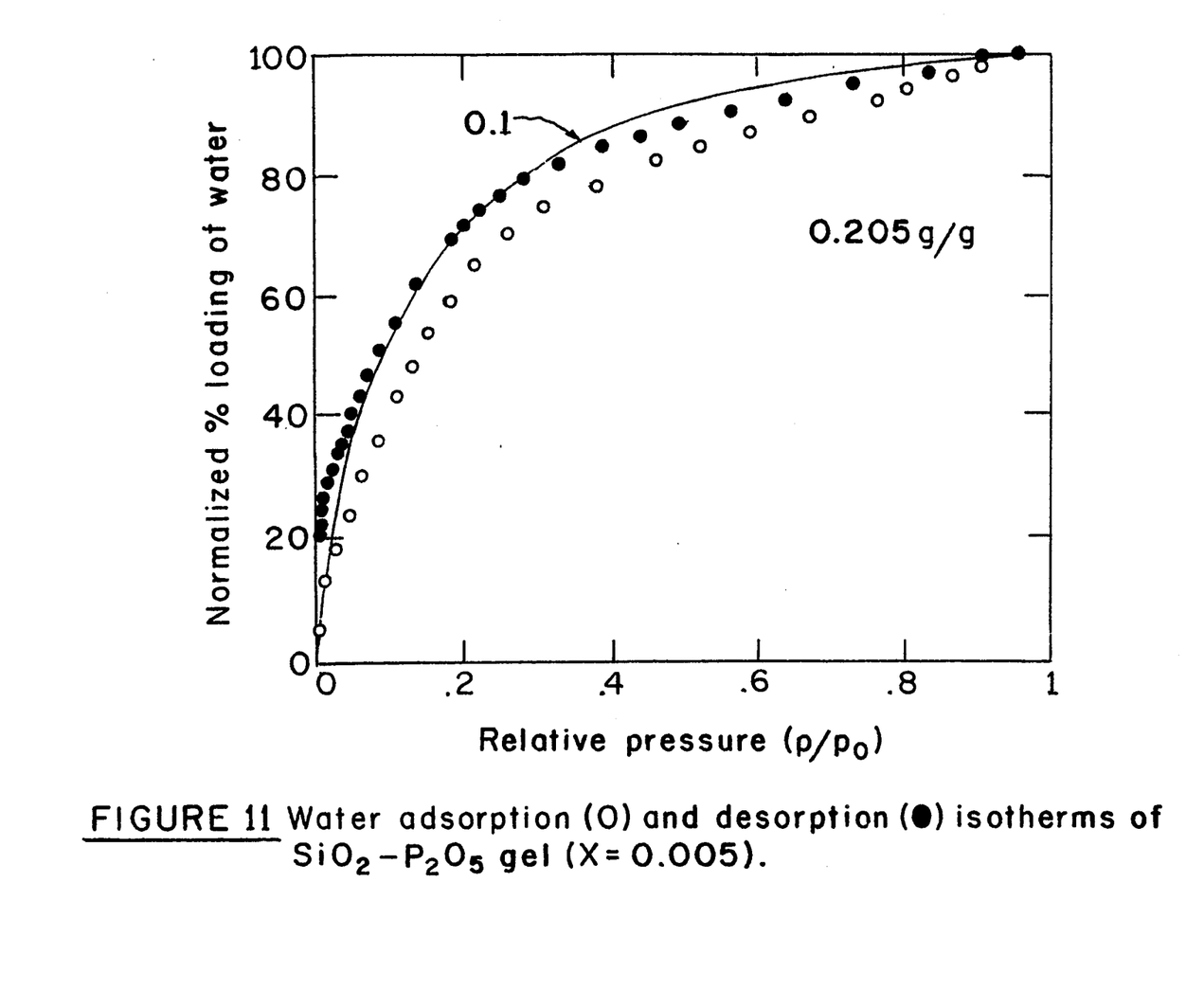

Water sorption isotherms of gels prepared using various amounts P are illustrated in FIG. 10. Gels 2, 3 and 4 which were prepared using X=0.0025, 0,005, and 0.01 exhibited moderate Type I isotherms without any high pressure condensation. Gels 5 to 8 which were prepared using X≧0.02 progressively gave linear type of isotherms followed by high pressure condensation and are unsatisfactory. The high pressure condensation increased with increasing X which is a consequence of macropores. These macropores or interparticle pores were probably created as a result of formation of discrete silicophosphate particles along with the gel networks. The adsorption and desorption isotherms of Gel 3 with X=0.005 which exhibited close to ideal shape (R=0.15) are shown in FIG. 11.

TABLE 5

Conditions for gel synthesis ($SiO_2$—$P_2O_5$ system, gelation time and sorption capacities.

| Gel | $X^1$ | $pH^2$ | Gelation time (hr) | Sorption capacity (g/g, p/po = 0.95)$^3$ |
|---|---|---|---|---|
| 1 | 0 | 5.85 | 3 | 0.276 |
| 2 | 0.0025 | 2.09 | 24 | 0.218 |
| 3 | 0.005 | 1.72 | 33 | 0.205 |
| 4 | 0.01 | 1.55 | 29.5 | 0.202 |
| 5 | 0.02 | 1.38 | 25 | 0.221 |
| 6 | 0.04 | 1.20 | 16 | ND |
| 7 | 0.1 | 0.87 | 7 | 0.308$^4$ |
| 8 | 0.2 | 0.57 | 0.17 | 0.522$^4$ |

$^1$[P]/[P] + [Si] = X; ND = Not determined
$^2$pH of the $H_3PO_4$ solution
$^3$p/po = relative vapor pressure of water.
$^4$Also includes high pressure condensation

EXAMPLE 7

Figure 12:
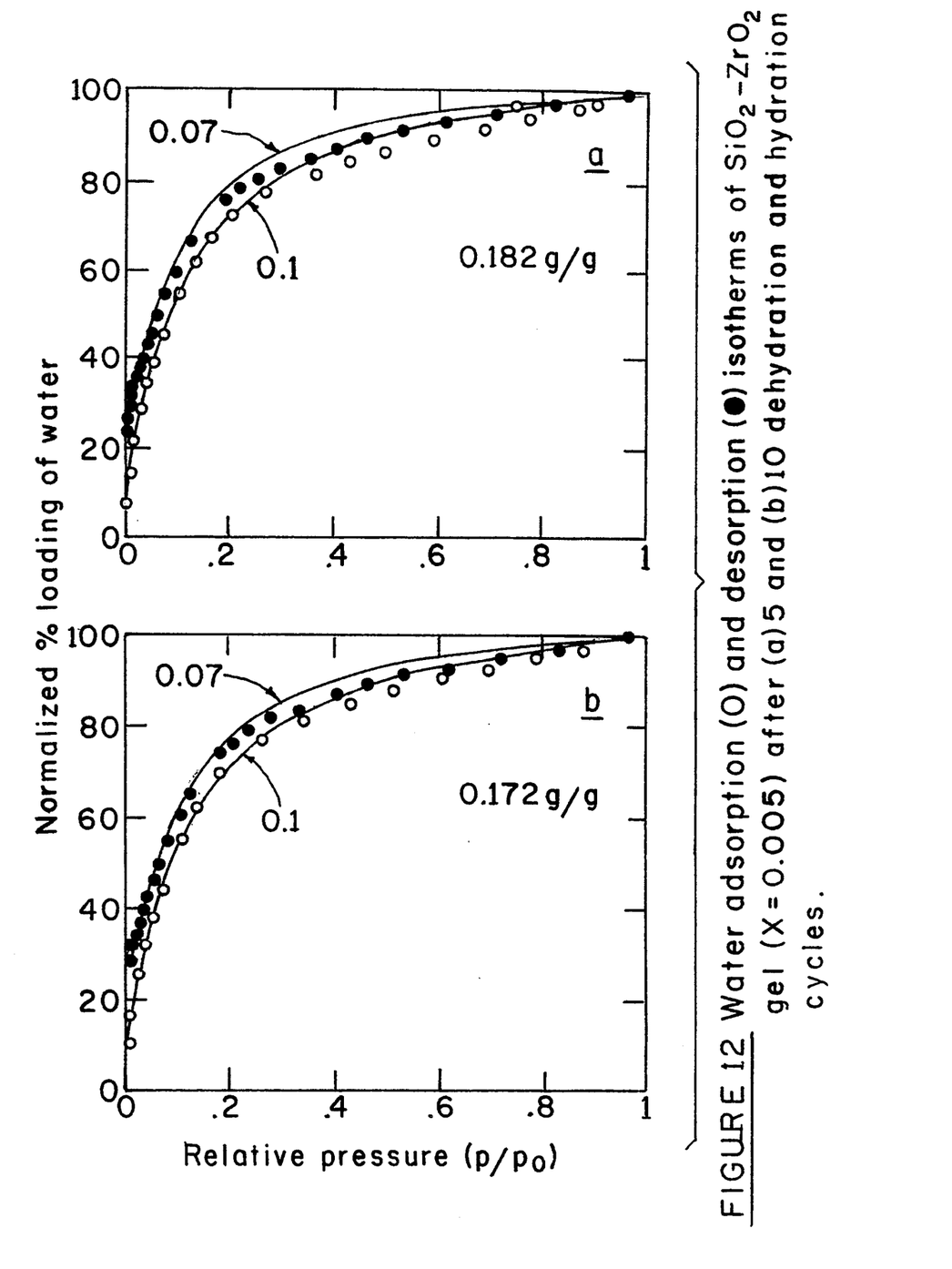
Figure 13:
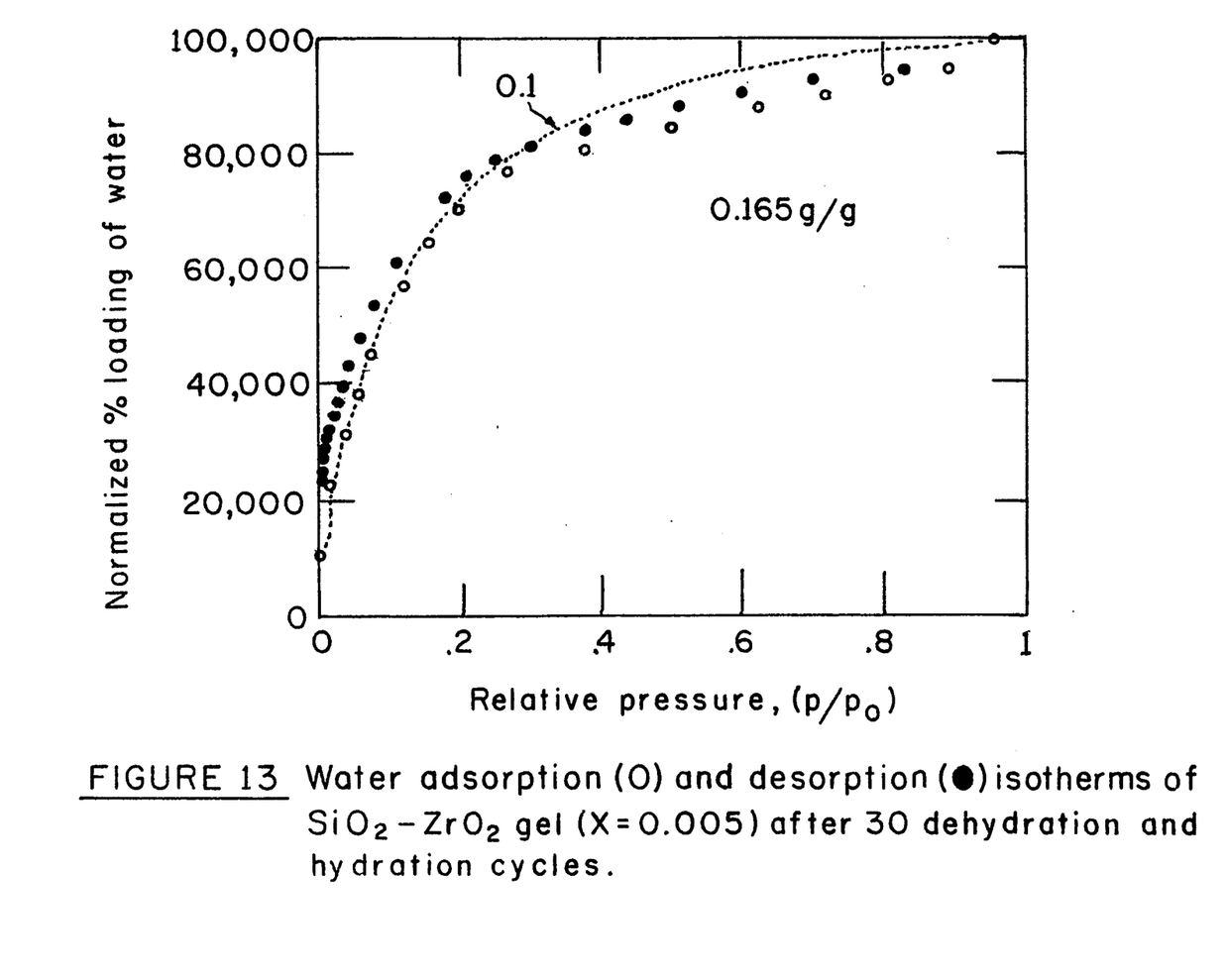

$SiO_2$—$ZrO_2$ gel which was prepared in Example 3 using X=0.005 (Gel 4 of Table 2) was selected for cyclic test (regenerative capacity). The xerogel was subjected to 5, 10 and 30 dehydration (200° C.) and hydration (saturated water vapor pressure—desiccator) cycles followed by water adsorption and desorption measurements. Although sorption capacity decreased slightly, the shape of isotherm, however, fell between R=0.1 to 0.07 as illustrated in FIG. 12. The improvement of isotherm shape of the gel which was subjected to 5 (FIG. 12a), 10 (FIG. 12b) or 30 (FIG. 13) cycles compared to the freshly prepared sample (R=0.15, FIG. 5) can be attributed to aging of the gel resulting in more hydrophilic behavior. These results indicate that this gel has not only long regenerative life, but its water sorption properties also improve upon repeated water adsorption and desorption cycles.

EXAMPLE 8

This example demonstrates that the gels described above have a low heat of adsorption necessary for their application in a cooling system, that is, close to the heat of liquefaction of water which is 10.6 Kcal/mole. Gel 4 of Table 2, prepared using X=0,005 Zr, was selected for the measurement of heat of adsorption. The isosteric heat estimated by measuring isotherms at three different temperatures varied from 10.3 to 13.1 Kcal/mole depending on the amount of adsorption. The net heat (the heat of adsorption minus the heat of liquefaction) measured using BET c constant was 1.5 Kcal/mole.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

What is claimed is:

1. In a desiccant cooling system process wherein a moving stream of air is progressively and sequentially adiabatically dehumidified by passing it through a desiccant material to produce warm dry air, cooled to produce cool dry air, and adiabatically humidified to produce cool nearly saturated air for introduction into the space to be cooled, the improvement which comprises utilizing as a desiccant material particles of a microporous, amorphous silica gel having pore diameter between about 6 and 8.7 angstroms and having a predetermined water sorption isotherm of moderate Type I shape and having an isotherm separation factor within the range of from about 0.07 to about 0.1.

* * * * *